United States Patent [19]

Rossio

[11] Patent Number: 5,223,162

[45] Date of Patent: * Jun. 29, 1993

[54] WASHING COMPOSITION FOR INHIBITING STRESS CRACKING IN POLY(ALKYLENE TEREPHTHALATE) ARTICLES AND METHODS OF USE THEREFOR

[75] Inventor: Charles E. Rossio, Carleton, Mich.

[73] Assignee: Diversey Corporation, Mississauga, Canada

[*] Notice: The portion of the term of this patent subsequent to Apr. 23, 2008 has been disclaimed.

[21] Appl. No.: 802,842

[22] Filed: Dec. 6, 1991

Related U.S. Application Data

[63] Continuation-in-part of Ser. No. 535,473, Jun. 8, 1990, Pat. No. 5,073,280, which is a continuation-in-part of Ser. No. 398,542, Aug. 25, 1989, Pat. No. 5,009,801, which is a continuation-in-part of Ser. No. 218,893, Jul. 14, 1988, Pat. No. 4,929,375.

[51] Int. Cl.$^5$ .............................................. C10M 173/02
[52] U.S. Cl. ................................. 252/33.2; 252/33; 252/49.3; 252/51.5 R; 252/56 R
[58] Field of Search ..................... 252/49.3, 33, 33.2

[56] References Cited

U.S. PATENT DOCUMENTS

| | | | |
|---|---|---|---|
| 4,929,375 | 5/1990 | Rossio et al. | 252/49.3 |
| 5,009,801 | 4/1991 | Wider et al. | 252/49.3 |
| 5,073,280 | 12/1991 | Rossio et al. | 252/49.3 |

Primary Examiner—Ellen McAvoy
Attorney, Agent, or Firm—Weintraub, DuRoss & Brady

[57] ABSTRACT

Stress cracking in poly(alkylene terephthalate) or polycarbonate articles of manufacture is inhibited by applying to the article a hydrophilic-substituted aromatic hydrocarbon having either an alkyl or aryl side chain, such as, e.g., a sodium sulfonate. Preferably, the stress crack inhibitor is applied to the article in the form of a dilute aqueous caustic bottle washing solution.

10 Claims, No Drawings

WASHING COMPOSITION FOR INHIBITING STRESS CRACKING IN POLY(ALKYLENE TEREPHTHALATE) ARTICLES AND METHODS OF USE THEREFOR

CROSS-REFERENCE TO RELATED APPLICATIONS

The present application is a continuation-in-part of copending U.S. patent application Ser. No. 535,473, filed Jun. 8, 1990, now issued as U.S. Pat. No. 5,073,280; which, in turn, is a continuation-in-part of U.S. patent application Ser. No. 398,542 filed on Aug. 25, 1989, now U.S. Pat. No. 5,009,801, which, in turn, is a continuation-in-part application of patent application Ser. No. 218,893, filed Jul. 14, 1988, now U.S. Pat. No. 4,929,375 for "Conveyor Lubricant Containing Alkyl Amine Coupling Agents", the disclosures of all these patents being hereby incorporated by reference.

BACKGROUND OF THE INVENTION

1. Field of the Invention

The present invention pertains to compositions for inhibiting stress cracking in poly(alkylene terephthalate) articles of manufacture. More particularly, the present invention concerns aqueous-based bottle washing compositions containing such stress crack inhibitors. Even more particularly, the present invention concerns caustic aqueous concentrates and bottle washing use solutions therefor which contain such stress crack inhibitors, and methods of washing poly(alkylene terephthalate) articles using the compositions hereof.

2. Prior Art

As is known to those skilled in the art to which the present invention pertains, there has been an ever increasing usage of synthetic resinous containers for storing fluids and solids. Likewise, as is known to those skilled in the art, such containers are normally filled or washed by passing them through filling and capping stations along manually, mechanically or electronically operated conveyor systems. Likewise, such containers are normally washed by passing them through a washing system along manually, mechanically or electronically-operated conveyor systems.

When poly(alkylene terephthalate) articles are washed for recycling and reuse thereof, highly caustic detergent solutions are normally used to remove old labels and to clean and sterilize the interior of the articles. However, these known cleaning compositions tend to attack and degrade the poly(alkylene terephthalate) making up the articles, which can lead to "stress cracks" within, or even completely through, the walls of the articles over repeated washing cycles. Typically, conventional caustic bottle washing compositions may, also, contain other constituents which have a deleterious effect on the poly(alkylene terephthalate) article disposed along the conveyor system.

Indeed, it has long been known that exposure by such articles to these compositions leads to these phenomenon which has been identified as "stress cracking" in these poly(alkylene terephthalate) containers and other such articles of manufacture. This is true with respect to both poly(ethylene terephthalate) and poly(butylene terephthalate) containers. The stress cracking phenomenon is also noted in polycarbonate articles of manufacture. Mild stress cracking which "fogs" the normally transparent PET material and which extends only partially through the wall of an article is commonly referred to as "hazing".

As noted, conventional aqueous-based bottle washing compositions containing caustics, alcohols nonionic surfactants and/or other additives do not inhibit or prevent stress cracking in such containers, but rather, promote stress cracking.

In U.S. Pat. No. 4,929,375 there is disclosed a highly dilutable aqueous lubricant concentrate which appears to inhibit stress cracking by combining a tertiary alkyl amine as a saponifying agent and an alkyl aryl sulfonate, as a solubilizing agent for a long chain fatty acid. While the compositions of the patent are efficacious for preparing highly dilutable lubricants, it has been found that the tertiary amine, per se, is not always essential to stress crack inhibition.

Rather, it has now been found that a certain class of alkyl aryl sulfonates and other hydrophile-terminated aromatic compounds, when added to a caustic bottle washing composition, either alone or in combination with free-base amines, will inhibit stress cracking when formulated into a bottle washing system. This finding enables the production of dilutable, cost efficient, caustic aqueous bottle washing compositions without any dilatory effects caused by the presence of the amine. Likewise, this finding enables implementation of other means and methods for inhibiting stress cracking in poly(alkylene terephthalate) articles other than the above-referred to copending applications and issued patents.

Heretofore, the only proposed method of inhibiting stress cracking in plastic bottles known to the applicants, has been the incorporation of an alkali metal salt of a hydrophilic substituted aromatic hydrocarbon and other hydrotropes into a liquid bleach, such as disclosed in European Patent Application No. EP 302705 A2, filed Feb. 8, 1989. This application discloses the use of the hydrotropes in an adjustment to the bleach to inhibit stress cracking in high density polyethylene containers. Yet, the art has not directed itself to bottle washing compositions and other media for inhibiting stress cracking in polyethylene or polybutylene terephthalate bottles or other articles of manufacture, such as polycarbonate articles.

U.S. Pat. No. 4,769,162 to Remus discloses a water soluble conveyor lubricant concentrate which includes an anionic surfactant and a water-soluble aluminum salt. The disclosure of Remus U.S. Pat. No. '162 is not directed to a bottle washing composition, per se.

SUMMARY OF THE INVENTION

In a first aspect of the present invention stress cracking in poly(alkylene terephthalate) articles of manufacture is inhibited by applying to the article of manufacture an alkali metal salt of a hydrophilic-substituted aromatic hydrocarbon having an aromatic or alkyl side chain. Aryl sulfonates are particularly preferred stress cracking inhibitors.

In another aspect of the present invention an aqueous-based bottle washing composition is prepared from a concentrate comprising:
(a) an alkali metal hydroxide;
(b) a chelant or sequestrant;
(c) the stress crack inhibitor; and
(d) water.

Optimally, the stress crack inhibitor is the sodium sulfonate of the aromatic hydrocarbon and is selected from the group consisting of sodium xylene sulfonate, sodium naphthalene sulfonate, sodium decyl diphenyl oxide sulfonate, sodium dimethyl napthalene sulfonate and mixtures thereof.

Ordinarily, the stress crack inhibitor is present in the concentrate in an amount ranging from about at least one percent to about twenty percent, by weight, based on the total weight of the concentrate.

In use, the concentrate may be diluted with water in concentration ranging from about 0.5 parts to about 100 parts, by weight, to form a use solution. A preferred use solution contains 0.7 percent by weight of the concentrate, based on the total weight of the solution. The use solution may be applied by manual application, spraying or the like.

Likewise, the stress crack inhibitor may be applied directly to the container as a pretreatment coating or may be incorporated as a component of a bottle washing solution during a washing cycle for a bottle operation.

For a more complete understanding of the present invention reference is made to the following detailed description and accompanying examples.

DESCRIPTION OF THE PREFERRED EMBODIMENT

As used throughout this specification, the term "bottle" is intended broadly to mean any type of container, and is not intended to be limited to bottles, per se.

As noted hereinabove, the present invention, in a first aspect provides a method for inhibiting stress cracking in a poly(alkylene terephthalate) or polycarbonate article of manufacture by applying thereto a hydrophilic-substituted aromatic hydrocarbon having an alkyl or aromatic side chain. More particularly, the present invention contemplates applying to such synthetic resinous articles of manufacture, a sodium salt of a hydrophilic-substituted aromatic compound having an alkyl or aromatic side chain, as a stress crack inhibitor.

In a further aspect hereof, the present invention, generally, provides an aqueous bottle washing concentrate and a use solution prepared therefrom which incorporates the stress cracking inhibitor.

The bottle washing concentrate contemplated herein, generally, comprises:
(a) an alkali metal hydroxide;
(b) a chelant or sequestrant;
(c) the stress crack inhibitor defined hereinabove; and,
(d) water, More particularly, the concentrate comprises, by weight:
(a) from about 10 to about 25 percent, of the alkali metal hydroxide;
(b) from about 2 to about 40 percent of the sequentrant;
(c) from about 2 to about twenty percent of the stress crack inhibitor, and
(d) from about 5 to about 75 percent of water.

Preferably, the concentrate comprises, by weight:
(a) from about 10 to about 30 percent of the alkali metal hydroxide;
(b) from about 7 to about 15 percent of the sequestrant;
(c) from about 1 to about 15 percent of the stress crack inhibitor; and,
(d) from about 34 to about 67 percent of water.

In use, the concentrate is diluted with water in a respective weight ratio of parts of concentrate to parts of water of from about 0.5 parts to about 2:1000, and, preferably, from about 1:100 to about 1:300. The use solution is prepared by admixing the concentrate with water at ambient conditions.

The stress crack inhibitor, as noted, is a hydrophilic-substituted aromatic hydrocarbon having an alkyl or aryl side chain. Optimally, the stress crack inhibitor is the sodium salt of a hydrophilic-substituted aromatic hydrocarbon having an alkyl or aryl side chain and, in particular, the sodium salt of a sulfonated hydrocarbon having an alkyl or aryl side chain.

Representative of the type of stress crack inhibitor contemplated herein is, for example, sodium xylene sulfonate, sodium decyl diphenyl oxide sulfonate, sodium naphthalene sulfonate, sodium dimethyl naphthalene sulfonate, sodium salts of linear alkyl benzene sulfonates, ordinarily having from about $C_8$ to about $C_{20}$ in the alkyl portion and the like, as well as mixtures thereof. The preferred stress crack inhibitor is sodium naphthalene sulfonate.

It should be noted, and as is apparent, that the stress crack inhibitors are also solubilizing agents, as well as anionic surfactants. This multi-functionality, thus, contributes to the solubilizing of the other components and the detergency of the bottle washing composition prepared therefrom.

Although not wishing to be bound by any theory, it would appear that the present stress crack inhibitors "mask" the reactive sites on poly(alkylene terephthalate) and polycarbonate articles of manufacture and prevent attack on the ester and carbonate sites. As is known, PET or poly(ethylene terephthalate) articles, such as beverage containers and the like, are synthesized by the following reaction:

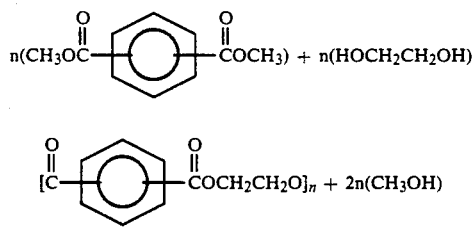

These containers and the like are subjected to cracking along the lines of stress on the surface thereof by aqueous hydroxide-containing solutions, either by attack on the ester linkage or direct solvent action which destroys the polymeric chain, thereby leading to structural failure.

It is theorized that the benzene ring of the stress crack inhibitor overlies the terephthalate ester linkages in proximity to the inhibitor and, thus, prevents the attack thereon by any reagent capable of attacking the ester linkage, e.g. hydroxide ions, which are usually present in bottle washing systems.

It is to be noted that the present invention is equally applicable to PBT or poly(butylene terephthalate) containers and polycarbonate as well as other such articles of manufacture.

In use and as above noted the stress crack inhibitor is present in an amount of at least one percent, by weight, based on the total weight of the concentrate.

Typically, bottle washing compositions are formulated with alkali metal hydroxides, such as sodium or potassium hydroxide. However, it has been found that sodium and/or potassium hydroxide hydroxide sometimes contributes to and promotes stress cracking in PET and PBT articles of manufacture. It has further been found, surprisingly, that the stress crack inhibitors hereof help to minimize the cracking caused by sodium or potassium hydroxide, particularly when the molecular size of the alkyl group thereon is sufficiently large, such as e.g., containing 10 to 30 carbon atoms.

In the practice of the present invention, an additional stress crack inhibiting component may, optionally, be added to the bottle washing composition hereof. The additional stress crack inhibitor is, however, not required.

A preferred class of additional stress crack inhibitors for use herein are neutrally charged amines, including primary, secondary and tertiary.

Various alkyl amines can be successfully employed in this invention. The alkyl amines useful herein are, preferably, amines having the general formula:

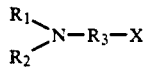

wherein $R_1$ and $R_2$ are each selected from the group consisting of alkyl groups, hydrogen, alcohols, and alkoxy groups, wherein $R_3$ is a linear alkyl group having 1 to 30 carbon atoms and, preferably, from 4 to 20 carbon atoms, and X is either hydrogen, an alkyl group, or a hydrophilic group.

Where X is hydrogen, among the useful amines are, for example, decyl dimethyl amine, N,N-dimethyl octyl amine, ethyl hexyl amine and 2-ethyl-1-hexylamine and the like, as well as mixtures thereof. Preferred amines include N,N-dimethyl octyl amine, dibutylamine, and mixtures thereof.

Useful hydrophilic groups which can function as X in the above formula include, for example,

(where $R_4$ and $R_5$ can be hydrogen, alkyl, alkoxy, or substituted alkyl)—OH, —SO$_3$, alkoxy and the like.

When X is OH, among the useful alcohol amines are primary, secondary and teritiary alcohol amines. Representative of such compounds are, for example, monoethanol amine, diethanol amine, triethanolamine, dimethyl amino ethanol,bis(2-hydroxyethyl) N-octyl amine, and the like, as well as mixtures thereof. While the smaller amines show better inhibition when used in conjunction with aryl sulfonates, they show some stress crack inhibition when used alone.

When X is —NH$_2$, a useful amine is dimethyl amino propyl amine. When X is

diamines useful in the practice of the present invention include, e.g., hydrogenated tallow diamine, coco diamine, tallow diamine, oleyl diamine, tridecyl ether diamine, and mixtures thereof. These diamines are commercially available from Sherex chemical under the mark "ADOGEN" fatty diamines. Another diamine which can be used in the practice of the present invention either alone or in combination with other amines such as e.g., oleyl diamine, is bis(3-aminopropyl)-dodecylamine, sold commercially by Lonza as LONZABAC 12.

Other preferred alkoxylated amines are, the ethoxylate amines for example, tallow (ethoxylated) amine, and coconut (ethoxylated) amine). These compounds are well known and commercially available.

The bottle washing concentrate hereof also contains a hardness sequestrant or chelant, for the purpose of sequestering Mg+ and Ca+ ions present in the water. The sequestrant may comprise either an organic or inorganic sequestrant. Useful organic sequestrants are alkali metal salts of ethylene diamine tetraacetic acid (EDTA), gluconic acid phosphonates, and gluconates as well as mixtures thereof. Examples of inorganic sequestrants are the phosphate hardness sequestrants, such as sodium tripolyphosphate. Although any of the enumerated sequestrants may be effectively integrated herein, preferably, the sequestrant is selected from the group consisting of sodium gluconate, a sodium salt of EDTA, and mixtures thereof, is employed. Na$_4$ EDTA sold under the trade name Versene ® and available from Dow Chemical Corporation is utilized herein. It is preferred that sufficient Na$_4$ EDTA be present to provide a sodium concentration in the dilute bottle washing use solution in the range of about 0.1 to about 0.3% by weight based on the total weight of the dilute use solution. Where used, and as noted, the hardness sequestrant is present in an amount of between about 2 and about 20 parts by weight based on total concentrate weight.

In preparing a bottle washing concentrate in accordance herewith, the stress crack inhibitor and the water are mixed together and heated to a temperature of about 100° F. to 120° F. While maintaining this temperature, the sequestrant, and alkali metal hydroxide, are sequentially added, in that order, to the solution, with mixing, after the addition of each component.

To form a use solution, the present concentrate is diluted with water in a respective weight ratio of parts of concentrate to parts of water ranging from about 0.5:100 to about 2:1000, and, in particular, from about 1:100 to about 1:300. The use solution is prepared by mixing the concentrate with water at ambient conditions.

It should, also, be noted that the stress crack inhibitor may be otherwise applied to the container, such as by directly coating the container therewith as a pretreatment.

Alternatively, the stress crack inhibitor may be incorporated into a rinse and applied therewith during a rinsing cycle normally associated with a bottle operation.

Furthermore, the stress crack inhibitor may be applied in poly(alkylene terephthalate) mold grease, etc. and the like.

For a more complete understanding of the present invention reference is made to the following examples. In the examples, which are illustrative and not limitative, all parts are by weight.

EXAMPLE I

A bottle wash concentrate was prepared by mixing together at 120° F., with stirring, water, and Sodium Gluconate as a water conditioner and soil removal additive. Thereafter, while maintaining the temperature, there was sequentially added to the solution, a sequestrant, a 50% sodium hydroxide solution in water, and a small amount of a stress crack inhibitor.

The ingredients employed and their respective amounts are shown below.

| Ingredient | Parts |
|---|---|
| Water | 58.74 |
| First sequestrant[1] | 15.55 |
| Second sequestrant[2] | 10.20 |
| NaOH (50%) | 14.00 |
| premixed stress crack inhibitor[3] | 1.51 |

[1] sodium gluconate
[2] a phosphonate sequestrant, at a 50% concentration in water, sold under the mark "DEQUEST 2000" by MonSanto
[3] a premixed solution of 49.95% water, 0.1% of concentrated $H_2SO_4$, and 49.95% of an alkyl naphthalene sulfonate sold commercially by DeSoto chemical under the mark PETRO BA and having the structure:

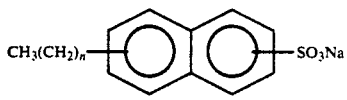

wherein n = 10 to 20.

EXAMPLE II

Following the procedure of Example I, and using the same components, as listed in Example I, an additional concentrate was prepared from the following:

| Ingredient | Parts |
|---|---|
| Water | 44.66 |
| First sequestrant | 15.55 |
| Second sequestrant | 10.20 |
| NaOH (50%) | 14.53 |
| stress crack inhibitor | 15.06 |

EXAMPLE III

A further bottle washing concentrate was prepared by mixing together at 120° F., with stirring, water and sodium gluconate, as in Example I. Thereafter, while maintaining the temperature, there was sequentially added to the solution, a sequestrant, a 50% sodium hydroxide solution, and an anionic surfactant sold under the mark TRITON H-66 by Rohm and Haas.

The ingredients employed and their respective amounts are shown below.

| Ingredient | Parts |
|---|---|
| Water | 59.75 |
| First sequestrant[1] | 15.55 |
| Second sequestrant[2] | 10.20 |
| NaOH (50%) | 13.90 |
| anionic surfactant[3] | 0.60 |

[1] Sodium Gluconate
[2] A phosphate sequestrant, at a 50% concentration in water, sold under the mark "DEQUEST 2000" by Monsanto
[3] A phosphate ester alkyl aryl anionic surfactant sold under the mark "TRITON H-66" by Rohm and Haas Company.

EXAMPLE IV

A series of dilute bottle washing compositions were prepared by adding 0.7% by weight of each of the premixed concentrates of Examples I–IV to the balance of a solution of 1.25 percent concentrated NaOH in water. An evaluation was also made of a control solution containing 1.25 percent concentrated NaOH in water.

A series of 1.5 liters poly(ehtylene terephthalate) (hereinafter referred to as PET) bottles were then immersed in the prepared dilute use solutions for a repeated series of 15 minute soak cycles at approximately, 77° F. to evaluate the effectiveness of the stress crack inhibitor in each solution. The bottles are removed for inspection after a number of such cycles, and the test is continued until a total of 30 cycles (450 min.) is completed.

The following table, Table I, sets forth the solutions evaluated, and the number of cycles when hazing of the bottle first appeared. Hazing refers to very fine stress cracking of the PET bottle which makes the bottle appear cloudy. The neck and base areas of the bottles are the primary contact where hazing occurs.

TABLE I

| | Number of Cycles to Hazing | |
|---|---|---|
| | Bottle Base | Bottle Neck |
| 2.5% NaOH (control) | 4 | 9 |
| Formula from Example I | 11 | 14 |
| Formula from Example II | 10 | 13 |
| Formula from Example III | 11 | 12 |

An evaluation of the data from the above-table clearly shows that in each case, the solution which contained the stress crack inhibitor performed superior to the 2.5% NaOH solution, with hazing at the bottle base taking over twice as many cycles to appear as in the solution containing only the sodium hydroxide.

Having, thus, described the invention, what is claimed is:

1. A method of inhibiting stress cracking in a poly-(alkylene terephthalate) or polycarbonate article of manufacture, comprising:
   washing the article of manufacture with a caustic detergent solution containing a hydrophilic-substituted aromatic hydrocarbon having either an alkyl or an aryl side chain.

2. The method of claim 1, wherein the stress crack inhibitor is the sodium salt of a hydrophilic-substituted aromatic hydrocarbon having either an alkyl or aryl side chain.

3. The method of claim 2, wherein: the stress crack inhibitor is selected from the group consisting of:
   (a) sodium xylene sulfonate;
   (b) sodium decyl diphenyl oxide sulfonate;
   (c) sodium naphthalene sulfonates;
   (d) a sodium salt of a linear alkyl benzene sulfonate; and,
   (e) mixtures thereof.

4. The method of claim 3 wherein the stress crack inhibitor is applied by applying a dilute bottle washing composition thereto, the composition comprising:
   (a) water, and
   (b) a concentrate, comprising:
      (1) an alkali metal hydroxide;
      (2) a sequestrant;
      (3) the stress crack inhibitor, and
      (4) water.

5. A bottle washing solution concentrate, comprising:
   (a) an alkali metal hydroxide;
   (b) a sequestrant;
   (c) a stress crack inhibitor which is a hydrophilic-substituted aromatic hydrocarbon having an alkyl or aryl side chain; and,
   (d) water.

6. The concentrate of claim 5, wherein:
   the stress crack inhibitor is the sodium salt of a hydrophilic-substituted aromatic hydrocarbon having either an alkyl or aryl side chain.

7. The concentrate of claim 5, wherein:
the stress crack inhibitor is selected from the group consisting of:
(a) sodium xylene sulfonate;
(b) sodium decyl diphenyl oxide sulfonate;
(c) sodium naphthalene sulfonates;
(d) the sodium salt of a linear alkyl benzene sulfonate; and,
(e) mixtures thereof.

8. The concentrate of claim 5, wherein the concentrate comprises:
(a) from about 10 percent to about 25 percent, by weight, based on the total composition weight, of the alkali metal hydroxide;
(b) from about 2 percent to about 40 percent, by weight, based on the total composition weight, of the sequestrant;
(c) from at least about 1 percent to about 20 percent, by weight, based on the total composition weight, of the stress crack inhibitor; and
(d) from about 5 percent to about 75 percent, by weight, based on the total composition weight, of water.

9. The concentrate of claim 5, further comprising an amine as an additional stress crack inhibitor.

10. The concentrate of claim 5, wherein the sequestrant comprises sodium gluconate.

* * * * *

UNITED STATES PATENT AND TRADEMARK OFFICE
CERTIFICATE OF CORRECTION

PATENT NO. : 5,223,162
DATED : June 29, 1993
INVENTOR(S) : Charles E. Rossio

It is certified that error appears in the above-indentified patent and that said Letters Patent is hereby corrected as shown below:

Column 3, line 54, change "sequentrant" to --sequestrant--.

Column 6, line 5, change "(ethoxlayated) amine)." to --(ethoxlayted) amine.--

Signed and Sealed this

Twenty-sixth Day of April, 1994

*Attest:*

BRUCE LEHMAN

*Attesting Officer*   *Commissioner of Patents and Trademarks*